United States Patent [19]

Noah

[11] Patent Number: 4,790,415

[45] Date of Patent: Dec. 13, 1988

[54] HYDROPNEUMATIC BRAKE ACTUATOR ARRANGED TO MAINTAIN A CONSTANT BRAKE SHOE CLEARANCE

[75] Inventor: Lewis R. Noah, Greenville, S.C.

[73] Assignee: American Standard Inc., Spartanburg, S.C.

[21] Appl. No.: 163,493

[22] Filed: Mar. 3, 1988

[51] Int. Cl.⁴ ............................................. F16D 65/54
[52] U.S. Cl. ............................. 188/196 P; 188/196 C
[58] Field of Search ............... 188/79.62, 71.8, 153 R, 188/196 A, 196 C, 196 P, 198, 199, 202, 203

[56] References Cited

U.S. PATENT DOCUMENTS

| | | | |
|---|---|---|---|
| 3,115,220 | 12/1963 | Cagle | 188/196 P |
| 3,186,521 | 6/1965 | Chovings | 188/196 P |
| 3,559,771 | 2/1971 | Crane | 188/71.8 |
| 4,323,144 | 4/1982 | Morris et al. | 188/196 A |

Primary Examiner—Duane A. Reger
Attorney, Agent, or Firm—G. J. Falce

[57] ABSTRACT

A hydropneumatic brake actuator having a friction member positionable by a power piston during a brake application stroke through a lost-motion connection therewith to establish a stop to limit return movement of the power piston during a brake release and thereby provide a predetermined brake shoe clearance. The friction member comprises an elastomeric-type O-ring that can be compressed axially to varying degrees, thereby adjusting the radial force that the O-ring exerts on the piston bore.

9 Claims, 2 Drawing Sheets

HYDROPNEUMATIC BRAKE ACTUATOR ARRANGED TO MAINTAIN A CONSTANT BRAKE SHOE CLEARANCE

BACKGROUND OF THE INVENTION

The present invention relates to hydropneumatic actuator devices and particularly to brake actuators for railway vehicles operating in passenger transit service. These brake actuators may be either tread or disc brake units.

Typically, these brake units employ a light spring to bias the brake shoe into constant engagement with the wheel tread or disc during brake release, in order to generate, by friction, sufficient heat to prevent the accumulation of ice and snow on these brake parts during winter time and to assure a prompt response of the brakes. These so-called "zero-clearance" arrangements, in addition, offer the advantages of simple construction and accordingly low-cost manufacture.

Recent tests, however, have shown that the drag of the brake shoes during periods of brake release requires a considerable expenditure of train power, particularly where the train consists of more than one or two cars. With today's high cost of fuel, the consumption of power needed to overcome brake drag becomes increasingly critical and can offset any advantages heretofore realized.

Accordingly, "positive clearance" maintaining arrangements have been developed which employ friction elements to achieve the "positive clearance" operating characteristic. Typically, these friction elements consist of an aluminum split ring, which is designed to exert a radial force against the cylinder bore in which a power piston is operative to apply braking force. This principle of operation has not been completely successful, however, due to the fact that rapid wear of the friction element itself occurs with resultant cylinder bore damage and accordingly a short service life.

SUMMARY OF THE INVENTION

The object of the present invention is to provide an improved hydropneumatic brake unit for railway brake apparatus having a simple, low-cost arrangement by which a positive brake shoe clearance is maintained throughout the range of brake shoe/wheel wear, without causing damage or excessive wear to the brake unit components.

This objective is achieved by providing a hydraulic brake actuator in which a power piston is operably-disposed in a cylinder bore to which the supply of pressurized hydraulic fluid is controlled to apply and release a vehicle brake. A friction member having a lost-motion connection with the power piston for providing relative movement therebetween comprises a pair of coaxially adjustable pressure plates that cooperate with each other so that each provides a portion of an annular groove in which an elastomeric friction ring is compressed. Screws are provided to permit axial adjustment of the respective pressure plates and thus the size of the width of the annular groove in order to vary the degree of compression and consequently the degree of radial force exerted by the elastomeric friction ring on the cylinder bore.

BRIEF DESCRIPTION OF THE DRAWING

These objectives and other advantages of the invention will become apparent from the following more detailed explanation, when taken with the accompanying single Figure drawings in which.

DESCRIPTION AND OPERATION

Figure 1:
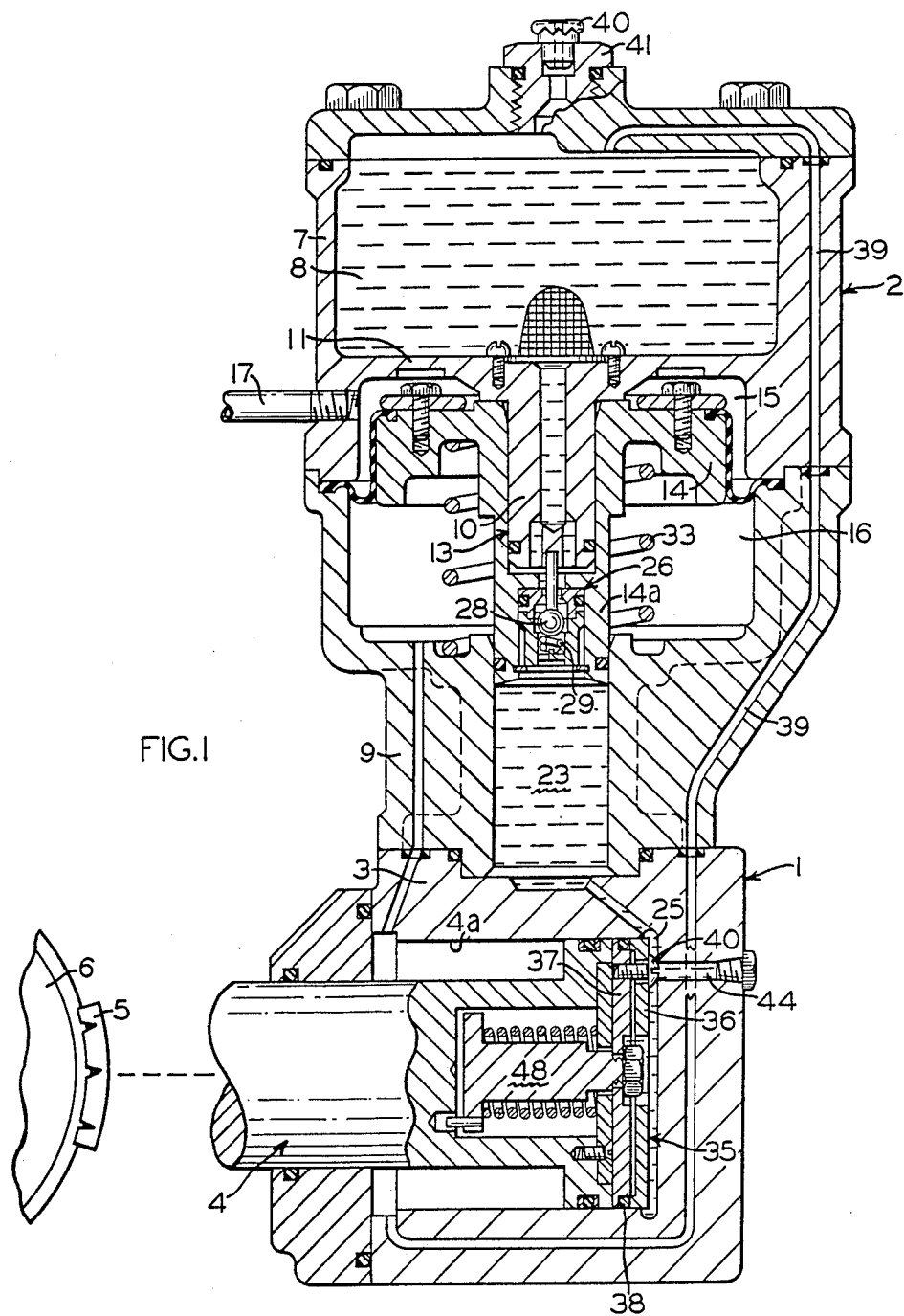
FIG. 1 is a sectional assembly view of a hydropneumatic brake actuator incorporating the present invention.

The brake unit embodying the present invention, as shown in FIG. 1, comprises a force actuator portion 1 and a hydropneumatic converter portion 2. The force actuator portion 1 includes a power cylinder 3 in which a power piston 4 is coaxially disposed in a bore 4a for operation between a brake release position, as shown, and an applied position. In brake release position of piston 4, a brake shoe 5 suitably mounted in a conventional manner to piston 4, is retracted a predetermined distance from the tread of a wheel 6 of a railway vehicle on which the brake unit may be mounted. This distance provides a positive clearance between brake shoe 5 and the wheel tread 6 that is is maintained constant over the wear life of the shoe and wheel tread, in accordance with the teachings of the present invention.

The hydropneumatic converter portion 2 is mounted on force actuator portion 1 in a vertical disposition relative thereto. Converter portion 2 includes an upper casing section 7 in which is formed a hydraulic reservoir 8, and a lower casing section 9 to which force actuator portion 1 is connected. Upper casing section 7 also forms a vertical guideway 10 that extends downwardly from a wall 11 forming the bottom of reservoir 8 toward casing section 9. A coaxial passage 12 in guideway 10 extends therethrough, so as to open at its upper end into reservoir 8.

A hydropneumatic converter unit 13 comprising an integral pneumatic control piston 14 and a hydraulic input piston 14a is arranged to operate vertically in converter portion 2 by telescopic-like operation on guideway 10, as hereinafter explained. Pneumatic control piston 14 is the diaphgragm-type, the outer periphery of the piston diaphragm being sealingly clamped between the two casing sections 7 and 9. Pneumatic control piston 14, in cooperation with that portion of upper casing section 7 below separating wall 11, forms a pneumatic pressure control chamber 15 adjacent the upper side of control piston 14. Formed below control piston 14 within lower casing section 9 is a spring chamber 16. Chamber 15 is connected via a supply pipe 17 to a source of pneumatic control pressure, and spring chamber 16 is vented to atmosphere via a fluid leakage recycling passage 39, that leads back to hydraulic reservoir 8 and a vented plug 40 of a fluid refill cap 41.

Projecting from the underside of piston 14 is a coaxial guide stem 18, the face of which forms hydraulic input piston 14a. Guide stem 18 is formed with a bore 19 extending therethrough and having a reduced diameter section 20 at approximately the axial midpoint of the bore 19, to divide the bore into upper and lower portions. The upper portion of piston bore 19 is sealingly mounted on guideway 10 to accommodate reciprocal movement of converter unit 13.

Input piston 14a is sealingly-disposed in a cylinder bore 21 formed in lower casing section 9. Bore 21, along with hydraulic input piston 14a and the portion 1, to which the converter portion 2 is mounted, define a hydraulic pressure chamber 23 into which the lower portion of bore 19 of guide stem 18 opens. Hydraulic chamber 23 is connected by a passage 24 to a chamber 25 formed in bore 4a of power cylinder 3.

Disposed in the lower portion of bore 19 of guide stem 18 is a cartridge-type check valve device 26 that is held in position against reduced diameter section 20 by a retainer ring 27. The check valve device comprises a ball valve 28 that is biased by a light spring 29 toward engagement with a tapered, annular seat 30. A spacer pin 31 integral with the bottom of guideway 10 projects through the reduced diameter section 20 of bore 19 and through an opening in the top of check valve cartridge 26 to engage and unseat ball valve 28, when control piston 14 is fully retracted by a release spring 33 in chamber 16.

Coaxially-disposed in chamber 25 of power cylinder 3 between the face of power piston 4 and a cylinder end wall 34 is an annular friction ring member 35 that comprises a pair of pressure plates 36, 37 and an elastomeric friction ring 38 contained in an annular groove 39 formed by the joint relationship of the respective pressure plates. A plurality of equally-spaced adjusting screws 40, only one of which is shown, pass through aligned openings 41 in pressure plate 36 for screw-threaded engagement with pressure plate 37 to maintain the pressure plates in spaced-apart, face-to-face relationship. An annular peripheral recess 42 in the face of pressure plate 37 is adapted to receive an annualar peripheral flange 43 that is upraised from the face of pressure plate 36 to form groove 39 in the periphery of the interconnected pressure plates. One side and the base of groove 39 is provided by recess 42 and the other side of groove 39 is provided by flange 43. Access holes 44 in the body of power cylinder 3 are aligned with screws 40 to accommodate a tool for turning adjusting screws 40 and thereby controlling the space betwen the respective pressure plates. This, in turn, establishes the axial dimension or width groove 39 and thus the degree of axial compression of elastomeric friction ring 38. As the width of groove 39 is adjusted, so is the deformation of elastic ring 38 and thus the degree of radial pressure that ring 38 exerts on cylinder bore 4a. For example, decreasing the width of groove 39 increases the axial compression of elastic ring 38, which in turn increases the radial pressure that ring 38 exerts on bore 4a, and vice versa.

A piston plate 45 is secured about its periphery, as by screws 46, to an annular recess 47 formed in the face of power piston 4. An axial projection 48 of pressure plate 37 is formed with an outturned flange 49 at one end and a reduced diameter section 50 at its opposite end, which is of such reduced diameter as to pass through a central opening 51 in piston plate 45 for screw-threaded engagement with a nut 52.

Formed in the face of power piston 4 is a hollow opening 53 in which projection 48 is housed. A spring 54 is arranged between outturned flange 49 and piston plate 45 to urge piston 4 into engagement with pressure plate 37 of friction ring member 35. A shoulder 55 formed by the reduced diameter section 50 of projection 48 is spaced-apart from pressure plate 37 a distance greater than the width of piston plate 45, thus providing a space between shoulder 51 and piston plate 45 in the release position shown. This arrangement constitutes a lost-motion connection between piston 4 and projection 48 via which friction ring member 35 is positioned in bore 4a subsequent to movement of power piston 4 during a brake application a predetermined distance corresponding to the space between shoulder 51 and piston plate 45.

Mounted on power piston 4 to prevent passage of hydraulic fluid along the cylinder bore 4a is a fluid pressure seal ring 56, in accordance with conventional practice.

Referring to FIG. 1, a brake application is initiated when pneumatic pressure chamber 15 is supplied with pneumatic control pressure commensurate with the degree of brake force desired, the manner in which this pneumatic control pressure is supplied being conventional and well known, and thus not deemed necessary for an understanding of the invention. With the face of pneumatic control piston 14 subjected to this pneumatic control pressure supplied to chamber 15, converter unit 13 is moved downwardly against the opposing force of spring 33. Cartridge 26 is carried with converter unit 13, moving ball valve 28 away from engagement with spacer pin 31. This allows the ball valve to be forced into engagement with its seat 30 by spring 29, thereby interrupting fluid pressure communication between hydraulic reservoir 8 and hydraulic chamber 23 via passage 12. With ball valve 28 thus closed, the force of pneumatic pressure acting on the upper side of control piston 14 is transmitted via hydraulic input piston 14a to the hydraulic fluid trapped in hydraulic chamber 23 and thereby converted to hydraulic force. Because the effective pressure area of the upper surface of control piston 14 is much greater relative to the effective area of hydraulic input piston 14a, the force transmitted to the hydraulic fluid in chamber 23, and thus to chamber 25, is multiplied according to the relative areas of the respective pistons.

Figure 2:
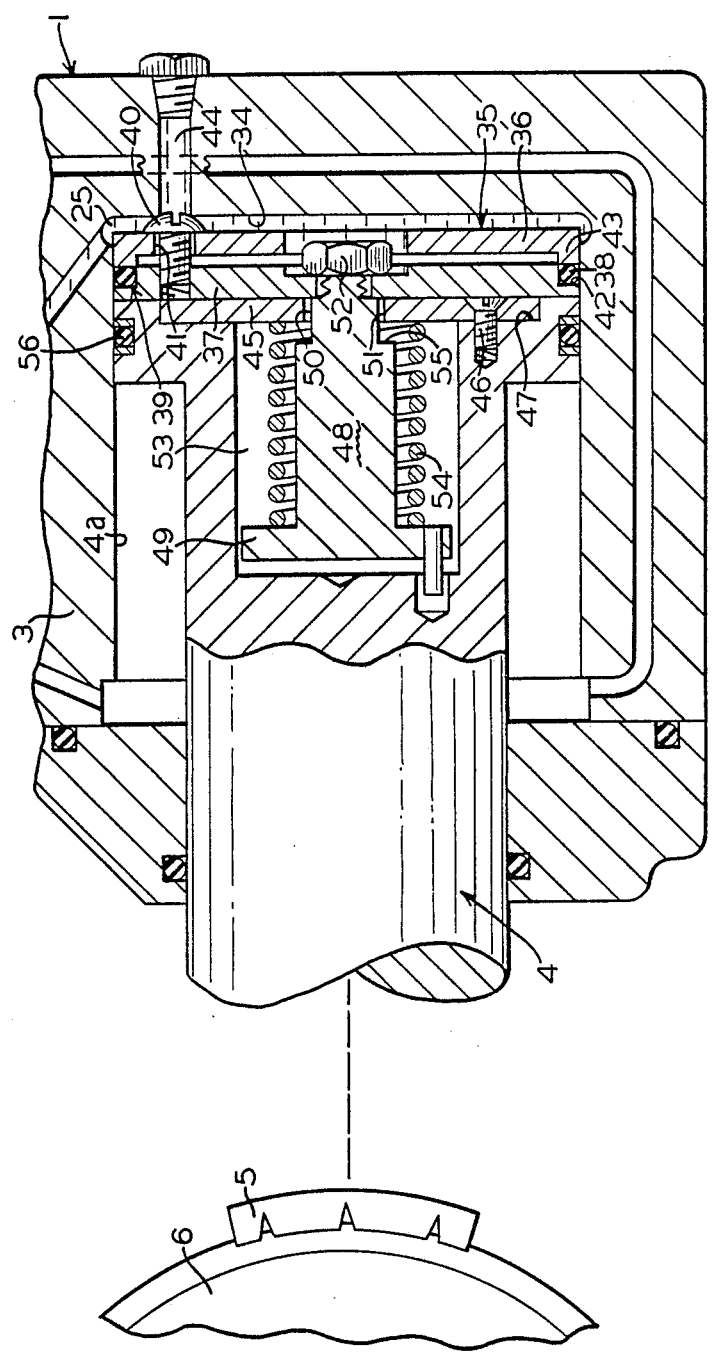
FIG. 2 is an enlarged view of the portion of the brake actuator of FIG. 1 showing details of the present invention.

As best seen in the enlarged view of FIG. 2, the hydraulic pressure acting on the face of power piston 4 forces this piston in a leftward direction, to in turn force brake shoe 5 into brake engagement with the tread of wheel 6. Plate 45 is carried with piston 4, whereby spring 54 is compressed between plate 45 and flange 49 of projection 48, it being understood that projection 48 remains stationary, by reason of friction ring member 35, to which projection 48 is connected, having frictional engagement with bore 4a of cylinder 3, until the space constituting the lost-motion connection between shoulder 55 and plate 45 is taken up. When piston 4 has moved sufficiently to allow piston plate 45 to engage shoulder 55, plate 45 will drag projection 48 and thus friction ring member 35 with piston 4 until brake shoe 5 engages wheel tread 6. Since friction ring member 35 is formed of an elastomeric material, as opposed to rings of metallic material used in previous designs, there is substantially no wear or damage to the machined surface of bore 4a in which piston 4 operates. The fluid pressure seal ring 56 employed in piston 4 is thus assured of a long service life without being damaged by a scuffed piston bore, thereby assuring that the undiminished buildup of hydraulic pressure is achieved at power piston 4, as necessary to achieve the desired brake force at wheel tread 6.

During subsequent release of the brakes, as by venting the pneumatic control pressure in chamber 15, to allow return spring 33 to retract converter unit piston 14, the hydraulic brake pressure in chamber 23 and effective on the face of power piston 4 is also relieved, thus allowing the compression force of spring 44 to force power piston 4 in a rightward direction into engagement with pressure plate 37 of friction ring member 35. The return stroke of piston 4 prior to engagement with friction ring member 35 corresponds to the above explained space comprising the lost-motion between piston plate 45 and shoulder 55 during the previous brake application, thus establishing a positive clearance between brake shoe 5 and wheel tread 6 corresponding to the aforementioned lost-motion between piston plate 45 and shoulder 55.

In order to achieve the desired frictional force between friction ring member 35 and cylinder bore 4a necessary to support the compressive force of spring 54 during the release stroke of piston 4, adjusting screws 40 are turned in the appropriate direction to increase or decrease the spaced-apart distance between the faces of pressure plates 36, 37. By varying this distance between pressure plates 36, 37, the width of annular groove 39 formed in friction ring member 35 is changed to accordingly change the degree of compression of elastomeric friction ring 38. The degree of compression or squeeze imparted to elastomeric friction ring 38 is thus adjustably controlled to obtain the desired variation in the radial pressure and thus friction force exerted by elastomeric friction ring 38 with cylinder bore 4a.

In order to admit "make-up" hydraulic fluid to hydraulic chamber 23 to compensate for any volumetric increase resulting from progressive advancement of power piston 4 in a brake application direction due to accumulated brake shoe/wheel wear over the life of brake shoe 5, ball check valve 28 is unseated by the pressure differential created thereacross subsequent to termination of the return stroke of power piston 4, thereby establishing hydraulic fluid communication between reservoir 8 and hydraulic chamber 23.

I claim:

1. A vehicle brake actuator device for use with a vehicle having a friction brake surface and brake means movable into and out of engagement therewith, said brake actuator device comprising:
   (a) a cylinder body having a bore therein with an open end and a closed end;
   (b) a power piston operably-disposed in said bore and forming at its one end in cooperation with said closed end of said bore a chamber in which the presence of fluid pressure is effective to actuate said power piston from a brake release position to a brake application position;
   (c) means for urging movement of said power piston toward said release position;
   (d) friction means for providing a stop with which said power piston is engageable to establish said release position thereof in the absence of fluid pressure in said chamber, comprising:
      (i) first and second pressure plates in said chamber between said power piston and said closed end of said bore;
      (ii) an annular groove formed jointly by said first and second pressure plates at the periphery thereof;
      (iii) elastomeric means in said annular groove having frictional engagement with said bore; and
      (iv) means for adjusting the relative axial position of said first and second pressure plates to vary the width of said groove and thereby the radial pressure with which said elastomeric means engages said bore; and
   (e) means for providing a lost-motion connection between said power piston and said friction means via which said friction means is axially displaced along said bore subsequent to movement of said power piston a predetermined distance from said release position, said predetermined distance corresponding to the distance said brake means is retracted from said braking surface during movement of said power piston from said brake application position to said brake release position.

2. A brake actuator device, as recited in claim 1, wherein said first and second pressure plates are in spaced-apart, face-to-face relationship, said first pressure plate having an annular peripheral flange upraised from the face thereof, and said second pressure plate having an annular peripheral recess formed in the face thereof into which said annular flange projects, said flange and said recess cooperating jointly to form said annular groove.

3. A brake actuator device, as recited in claim 2, further characterized in that said recess of said second pressure plate provides one side and a base of said annular groove, and said flange of said first pressure plate provides the other side of said annular groove.

4. A brake actuator device, as recited in claim 3, wherein said adjusting means comprises at least one screw freely passing through one of said first and second pressure plates and having a screw-threaded connection with the other of said first and second pressure plates to thereby vary the space between the faces thereof.

5. A brake actuator device, as recited in claim 4, further characterized in that the width between said one and said other sides of said annular groove varies as the space between the faces of said first and second pressure plates varies.

6. A brake actuator device, as recited in claim 5, further comprising at least one access opening in said cylinder body opening into said chamber in alignment with said at least one screw.

7. A brake actuator device, as recited in claim 3, wherein said means for providing said lost-motion connection comprises:
   (a) a projecting member fixed to one of said first and second pressure plates extending into a central opening formed at said one end of said power piston;
   (b) a first shoulder formed on said projecting member, thereby forming an annular recess in said projecting member between said shoulder and said one pressure plate; and
   (c) a piston plate fixed to said power piston so as to operate in said annular recess of said projecting member, the axial dimension of said piston plate being less than the axial dimension of said recess in said projecting member an amouint corresponding to said predetermined distance.

8. A brake actuator device, as recited in claim 7, wherein said means for urging movement of said power piston toward said release position is a spring.

9. A brake actuator device, as recited in claim 7, wherein said means for providing said lost-motion connection further comprises:
   (a) a second shoulder formed on said projecting member spaced from said first shoulder; and
   (b) said means for urging movement of said power piston toward said release position is a spring between said second shoulder and said piston plate.

* * * * *

UNITED STATES PATENT AND TRADEMARK OFFICE
CERTIFICATE OF CORRECTION

PATENT NO. : 4,790,415

DATED : December 13, 1988

INVENTOR(S) : Lewis R. Noah

It is certified that error appears in the above-identified patent and that said Letters Patent is hereby corrected as shown below:

Column 6, line 54, delete "amouint" and insert --amount--.

Signed and Sealed this

Second Day of May, 1989

Attest:

DONALD J. QUIGG

Attesting Officer

Commissioner of Patents and Trademarks